US008292185B2

(12) United States Patent
Ng

(10) Patent No.: US 8,292,185 B2
(45) Date of Patent: Oct. 23, 2012

(54) CIRCUITS FOR PREVENTING OVERVOLTAGE CONDITIONS ON ANTENNA TERMINALS AND METHOD

(75) Inventor: Kian-Ann Ng, Singapore (SG)

(73) Assignee: STMicroelectronics Asia Pacific Pte., Ltd., Singapore (SG)

( * ) Notice: Subject to any disclaimer, the term of this patent is extended or adjusted under 35 U.S.C. 154(b) by 901 days.

(21) Appl. No.: 11/259,974

(22) Filed: Oct. 26, 2005

(65) Prior Publication Data

US 2007/0075147 A1 Apr. 5, 2007

Related U.S. Application Data

(60) Provisional application No. 60/722,543, filed on Sep. 30, 2005.

(51) Int. Cl.
*G06K 13/00* (2006.01)

(52) U.S. Cl. .......... 235/476; 235/492; 235/494; 363/69; 363/70; 363/81; 363/84; 363/89; 363/125; 363/127

(58) Field of Classification Search .................. 235/492, 235/494; 363/89, 70, 69, 84, 81, 125, 127
See application file for complete search history.

(56) References Cited

U.S. PATENT DOCUMENTS 6,134,130 A * 10/2000 Connell et al. .................. 363/89
6,859,640 B2 * 2/2005 Bardouillet et al. ......... 455/41.1
6,940,467 B2 * 9/2005 Fischer et al. ............... 343/850

* cited by examiner

*Primary Examiner* — Michael G Lee
*Assistant Examiner* — Matthew Mikels

(57) ABSTRACT

A circuit includes an antenna terminal for generating a current through electromagnetic induction. The circuit also includes a rectifier for receiving the current and generating a rectified power supply voltage. In addition, the circuit includes a voltage clamp for sinking at least some of the current from the antenna terminal based on the rectified power supply voltage from the rectifier. The voltage clamp could include a control circuit (such as an N-channel transistor and a resistor) for controlling the sinking of at least some of the current from the antenna terminal. The voltage clamp could also include a sink circuit (such as an N-channel transistor) for sinking at least some of the current from the antenna terminal. The voltage clamp could further include a sink control circuit (such as a P-channel transistor and a resistor) for activating and deactivating the sink circuit based on operation of the control circuit.

21 Claims, 2 Drawing Sheets

CIRCUITS FOR PREVENTING OVERVOLTAGE CONDITIONS ON ANTENNA TERMINALS AND METHOD

CROSS-REFERENCE TO RELATED APPLICATIONS

This patent application claims priority under 35 U.S.C. §119(e) to U.S. Provisional Patent Application No. 60/722,543 entitled "CIRCUIT FOR PREVENTING OVERVOLTAGE CONDITIONS ON THE ANTENNA TERMINAL OF A CONTACTLESS SMARTCARD" filed on Sep. 30, 2005, which is hereby incorporated by reference.

TECHNICAL FIELD

This disclosure relates generally to wireless devices and more specifically to circuits for preventing overvoltage conditions on antenna terminals and method.

BACKGROUND

Smartcards are secure devices routinely used in a wide variety of applications. Smartcards often include integrated circuits (such as electronic circuitry and memory) embedded in small portable carriers. The integrated circuits in the smartcards are typically capable of receiving, transmitting, and storing information.

Smartcards may be broadly divided into different categories, including smartcards with contacts and contactless smartcards. Smartcards with contacts generally communicate after being physically connected via contacts to a smartcard reader or writer. Contactless smartcards generally communicate using wireless mechanisms, such as radio frequency (RF) communications. Contactless smartcards may have greater durability than smartcards with contacts because contactless smartcards are not physically connected to an external device. Also, contactless smartcards often receive operating power by rectifying an alternating current (AC) produced through electromagnetic induction to generate a direct current (DC) voltage. The DC voltage is used to activate and operate the integrated circuits in the contactless smartcards. This helps to eliminate the need for batteries or other internal power supplies in the contactless smartcards, which also helps to reduce the size and cost of the contactless smartcards.

Contactless smartcards have many broad applications. Information stored within and transmitted by a contactless smartcard can be used to perform various functions. These functions could include controlling security access to a restricted area, performing personal identification during commercial transactions, identifying products to ascertain origin and quality, and identifying animals to conduct experiments. One commonly used type of contactless smartcard is a commutation card. A commutation card typically represents a type of smartcard used to gain access to a form of transportation (such as a train or subway). The commutation card typically allows a user of the card to pass through a ticket gate without requiring the user to physically insert the card into a card reader.

FIG. 1 illustrates a typical contactless smartcard 100. In this example, the typical contactless smartcard 100 includes an antenna terminal 102, a resonance capacitor 104, a rectifier circuit 106 producing a power supply output 108, an analog circuit 110, a digital circuit 112, a memory control circuit 114, a memory circuit 116, and a smoothing capacitor 118.

The antenna terminal 102 is typically formed of antenna coils and communicates with a smartcard reader or writer via an electromagnetic field. The antenna coils are often thin wire coils that wrap around an inner perimeter of the smartcard 100 in one or more turns, forming the antenna terminal 102. A smartcard reader or writer typically radiates a high-frequency magnetic field (such as a 13.56 MHz field) via its own antenna. When the antenna terminal 102 of the contactless smartcard 100 is located within the magnetic field, electromagnetic waves from the smartcard reader or writer are received by the antenna coils, producing an AC signal through electromagnetic induction.

The resonance capacitor 104 is coupled to the antenna terminal 102 in parallel so as to resonate at the frequency of the electromagnetic waves. The rectifier circuit 106 converts the AC signal from the antenna terminal 102 into a DC voltage (the power supply output 108). The smoothing capacitor 118 is connected in parallel to the rectifier circuit 106 so as to smooth the power supply output 108. The power supply output 108 is provided to the analog circuit 110, the digital circuit 112, the memory control circuit 114, and the memory circuit 116.

The analog circuit 110 typically includes components such as a demodulator circuit and a modulator circuit. The demodulator circuit is often used to decode received data transmitted over a carrier of the electromagnetic waves. The modulator circuit is often used to superimpose a transmission signal generated by the digital circuit 112 on the carrier of the electromagnetic waves.

The digital circuit 112 typically includes components such as a central processing unit (CPU) for performing various digital signal processes. The memory control circuit 114 typically controls the operation of the memory circuit 116. The memory circuit 116 is typically used to store and facilitate retrieval of data. The memory circuit 116 could, for example, represent a nonvolatile memory.

The power provided by the rectifier circuit 106 is often proportional to the strength of the magnetic field imposed on the antenna terminal 102. At the same time, the strength of the magnetic field on the antenna terminal 102 is inversely proportional to the distance of the antenna terminal 102 from the smartcard reader or writer. As a result, the strength of the magnetic field often varies very greatly in working conditions. At very short distances between the smartcard reader or writer and the antenna terminal 102, a voltage induced in the antenna terminal 102 could exceed the required supply voltage. This is generally referred to as an "overvoltage condition."

FIG. 2 illustrates a typical power supply circuit 200 used in the typical contactless smartcard 100 to derive power from a smartcard reader or writer and to provide power to other components of the smartcard 100. In this example, the power supply circuit 200 includes the antenna terminal 102, the resonance capacitor 104, the rectifier circuit 106, two smooth capacitors **118*a*-118*b*, two zener diodes 202*a*-202*b*, and a voltage regulator 204. The rectifier circuit 106 in FIG. 2 is shown as a full-wave rectification circuit that employs four diodes 206**.

In the power supply circuit 200 of FIG. 2, without any protection against overvoltage conditions, the voltages denoted $V_{AC0}$ and $V_{AC1}$ could easily exceed the typical breakdown voltages of semiconductor devices within the smartcard 100. Therefore, typical power supply circuits 200 often attempt to limit or clamp the voltages $V_{AC0}$ and $V_{AC1}$ below the breakdown voltages. In order to clamp the voltages $V_{AC0}$ and $V_{AC1}$, zener diodes **202*a*-202*b*** are coupled to the voltages $V_{AC0}$ and $V_{AC1}$, respectively. When either voltage $V_{AC0}$ or voltage $V_{AC1}$ is above a certain threshold, the associated zener diode triggers and clamps the voltage $V_{AC0}$ or $V_{AC1}$ below the breakdown voltage. However, zener diodes are often not readily available in standard process technologies, such as the Complimentary Metal Oxide Semiconductor (CMOS) process technology. Also, zener diodes often lack flexibility in being adopted into other systems.

SUMMARY

This disclosure provides circuits for preventing overvoltage conditions on antenna terminals and method In a first embodiment, a circuit includes an antenna terminal capable of generating a current through electromagnetic induction. The circuit also includes a rectifier capable of receiving the current and generating a rectified power supply voltage. In addition, the circuit includes a voltage clamp capable of sinking at least some of the current from the antenna terminal based on the rectified power supply voltage from the rectifier.

In particular embodiments, the voltage clamp includes a control circuit (such as an N-channel transistor and a resistor) capable of controlling the sinking of at least some of the current from the antenna terminal based on the rectified power supply voltage from the rectifier. The voltage clamp also includes a sink circuit (such as an N-channel transistor) capable of sinking at least some of the current from the antenna terminal. The voltage clamp further includes a sink control circuit (such as a P-channel transistor and a resistor) capable of activating and deactivating the sink circuit based on operation of the control circuit.

In a second embodiment, an apparatus includes circuitry capable of wirelessly communicating with an external device. The apparatus also includes a power supply circuit. The power supply circuit includes an antenna terminal capable of generating a current through electromagnetic induction and a rectifier capable of receiving the current and generating a rectified power supply voltage. The circuitry is capable of operating using the rectified power supply voltage. The power supply circuit also includes a voltage clamp capable of sinking at least some of the current from the antenna terminal based on the rectified power supply voltage from the rectifier.

In particular embodiments, the apparatus represents a smartcard, and the circuitry includes an analog circuit, a digital circuit, a memory control circuit, and a memory. Also, the external device includes at least one of: a contactless smartcard reader and a contactless smartcard writer.

In a third embodiment, a method includes generating a current through electromagnetic induction at an antenna terminal. The method also includes generating a rectified power supply voltage based on the current. In addition, the method includes sinking at least some of the current from the antenna terminal based on the rectified power supply voltage.

In a fourth embodiment, a voltage clamp includes a control circuit capable of controlling sinking of at least some of a current from an antenna terminal based on a rectified power supply voltage from a rectifier. The rectified power supply voltage is based on the current from the antenna terminal. The voltage clamp also includes a sink circuit capable of sinking at least some of the current from the antenna terminal. In addition, the voltage clamp includes a sink control circuit capable of activating and deactivating the sink circuit based on operation of the control circuit.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 3:
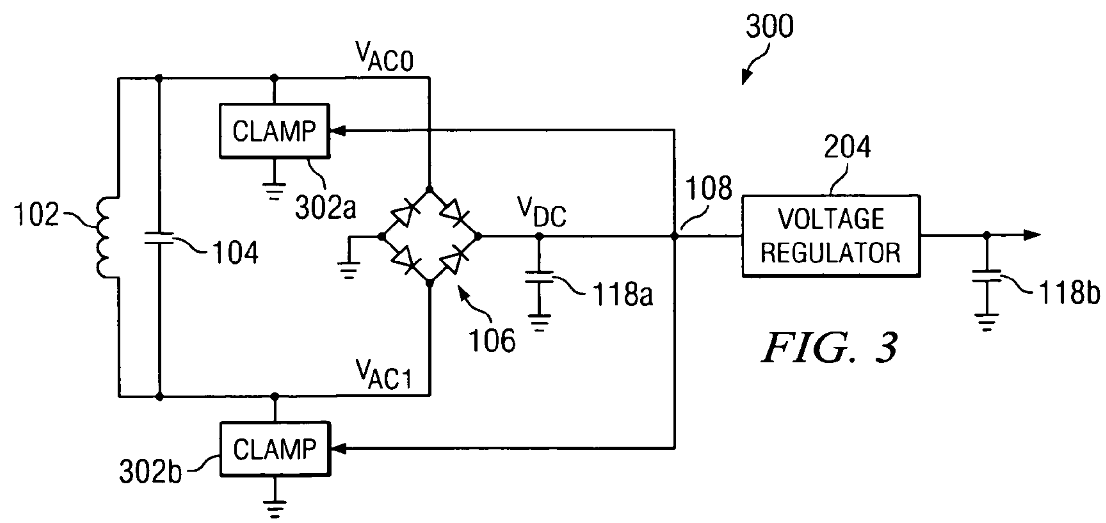
FIG. 3 illustrates a power supply circuit according to one embodiment of this disclosure.
Figure 4:
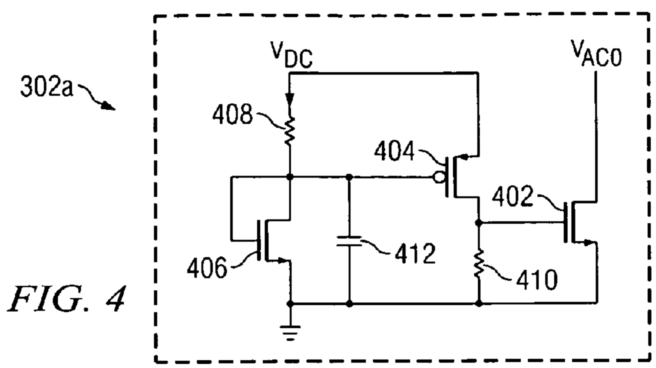
FIG. 4 illustrates an overvoltage clamp circuit in the power supply circuit of FIG. 3 according to one embodiment of this disclosure.
Figure 5:
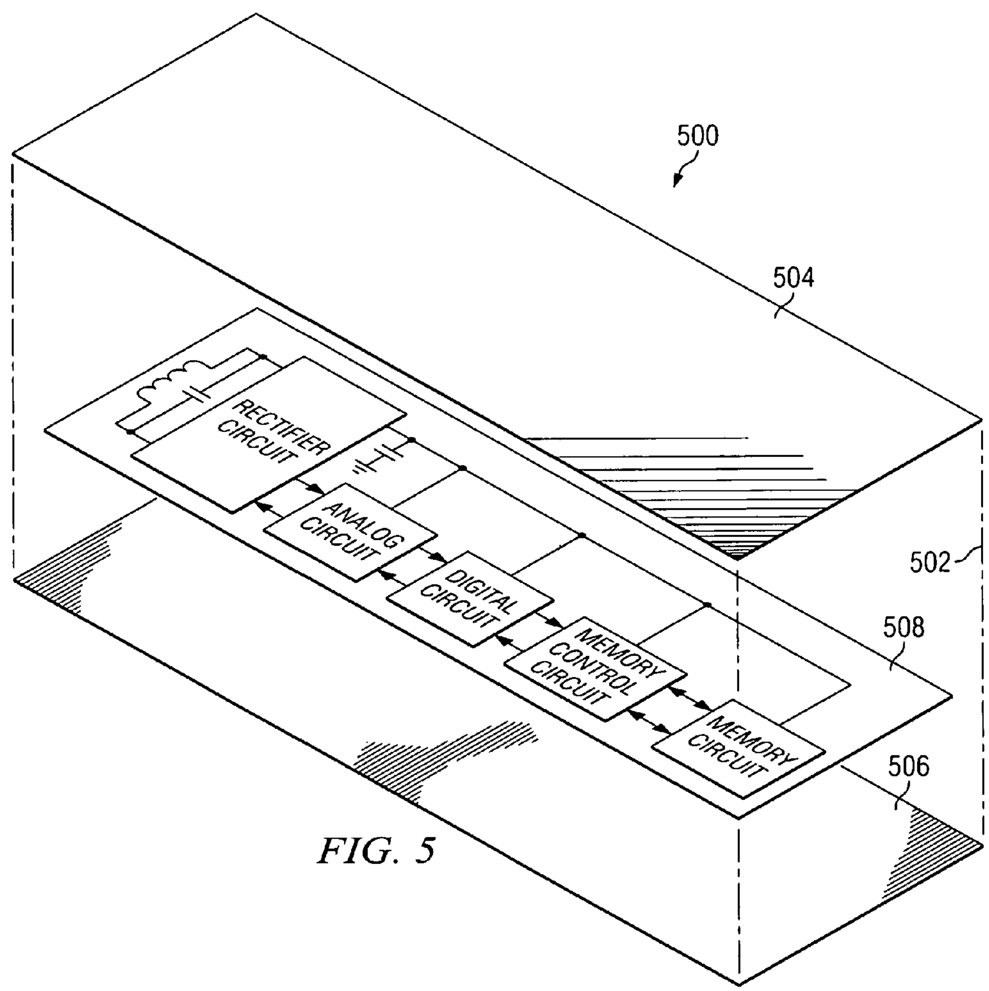
FIG. 5 illustrates an example contactless smartcard according to one embodiment of this disclosure.

FIGS. 3 through 5, discussed below, and the various embodiments described in this disclosure are by way of illustration only and should not be construed in any way to limit the scope of the claimed invention. Those skilled in the art will understand that the principles described in this disclosure may be implemented in any suitably arranged device or system.

FIG. 3 illustrates a power supply circuit 300 according to one embodiment of this disclosure. The embodiment of the power supply circuit 300 shown in FIG. 3 is for illustration only. Other embodiments of the power supply circuit 300 may be used without departing from the scope of this disclosure.

In one aspect of operation, the power supply circuit 300 is capable of reducing or preventing the occurrence of overvoltage conditions on the antenna terminal 102 of a contactless smartcard or other device. This may help to reduce or minimize damage to semiconductor components within the contactless smartcard or other device caused by the overvoltage conditions.

As shown in FIG. 3, the power supply circuit 300 includes the antenna terminal 102, the resonance capacitor 104, the rectifier circuit 106, the smooth capacitors 118*a*-118*b*, and the voltage regulator 204. The power supply circuit 300 in this example embodiment also includes two overvoltage clamp circuits 302*a*-302*b*. The overvoltage clamp circuits 302*a*-302*b* are coupled to the voltages $V_{AC0}$ and $V_{AC1}$, respectively. The voltages $V_{AC0}$ and $V_{AC1}$ denote voltages at any point between the resonance capacitor 104 and the rectifier circuit 106 along their respective lines. As a result, the overvoltage clamp circuits 302*a*-302*b* may be coupled at any point between the resonance capacitor 104 and the rectifier circuit 106.

In general, the overvoltage clamp circuits 302*a*-302*b* are based on the principle that the rectified voltage produced by the rectifier circuit 106 (denoted $V_{DC}$) is directly proportional to the peak voltage of the voltages $V_{AC0}$ and $V_{AC1}$. Because of this, the rectified voltage VDC can be used to implement a negative feedback system to clamp the voltages $V_{AC0}$ and $V_{AC1}$ in the event of an overvoltage condition.

FIG. 4 illustrates an overvoltage clamp circuit in the power supply circuit 300 of FIG. 3 according to one embodiment of this disclosure. In particular, FIG. 4 illustrates the overvoltage clamp circuit 302*a* of FIG. 3. The same or similar circuit could be used as the overvoltage clamp circuit 302*b* of FIG. 3. The embodiment of the overvoltage clamp circuit 302*a* shown in FIG. 4 is for illustration only. Other embodiments of the overvoltage clamp circuit 302*a* may be used without departing from the scope of this disclosure.

As shown in FIG. 4, the overvoltage clamp circuit 302*a* includes an N-channel MOS transistor 402, a P-channel MOS transistor 404, an N-channel MOS transistor 406, resistors 408-410, and a capacitor 412. The transistor 402 has a drain terminal coupled to the voltage $V_{AC0}$ (or to the voltage $V_{AC1}$ if the transistor 402 is used in the overvoltage clamp circuit 302*b* of FIG. 3). The transistor 402 has a source terminal coupled to ground and a gate terminal coupled to a drain terminal of the transistor 404.

The transistor 404 has a source terminal coupled to the rectified voltage $V_{DC}$. The transistor 404 has a drain terminal coupled to the gate terminal of the transistor 402 and to ground via the resistor 410. The transistor 404 has a gate terminal coupled to drain and gate terminals of the transistor 406. In some embodiments, the source terminal of the transistor 404 is coupled to the rectified voltage $V_{DC}$ at a node located between the smooth capacitor 118*a* and the voltage regulator 204.

The transistor 406 has a drain terminal coupled to the rectified voltage $V_{DC}$ via the resistor 408. The transistor 406 has a source terminal coupled to ground. The transistor 406 has a gate terminal coupled to the drain terminal of the transistor 406 so that the transistor 406 has a diode configuration. The capacitor 412 is coupled between the source and drain terminals of the transistor 406.

In this example, the transistor 402 represents a sink circuit capable of sinking at least some current to reduce the voltage $V_{AC0}$. Also, the transistor 406 and resistor 408 represent a control circuit that controls when the overvoltage clamp circuit 302*a* sinks current to reduce the voltage $V_{AC0}$. In addition, the transistor 404 and resistor 410 represent a sink control circuit capable of activating or deactivating the sink circuit based on the control circuit.

In one aspect of operation, when the voltage $V_{AC0}$ experiences an overvoltage condition, the rectified voltage $V_{DC}$ rises above a threshold voltage value. The voltage on the transistor 406 turns on the transistor 404 and subsequently the transistor 402. The transistor 402 is capable of sinking large currents, such as by having a large width. When the transistor 402 is turned on, the transistor 402 effectively increases the loss on an inductor-capacitor tank (formed by the antenna terminal 102 and the resonance capacitor 104). As a result, the transistor 402 reduces the peak voltage of the voltage $V_{AC0}$ so the rectified voltage $V_{DC}$ falls below the threshold voltage value. Through a negative feedback path formed by the rectifier circuit 106 and the overvoltage clamp circuit 302*a*, overvoltage protection for the voltage $V_{AC0}$ is achieved.

In some embodiments, the resistance value of the resistor 408 can be designed to set the threshold voltage value required to turn on the transistor 406. The size of the transistor 406 could also be configured to set the threshold voltage value.

The capacitor 412 is used to keep the voltage on the gate of transistor 404 stable in the event of transient dips in voltage $V_{DC}$ due to strong current loading from the voltage regulator 204 or from the load of the voltage regulator 204.

When overvoltages in the voltages $V_{AC0}$ and $V_{AC1}$ are successfully prevented, the rectified voltage $V_{DC}$ drops below the threshold voltage value, thus turning the transistor 406 off. Subsequently, the transistor 404 and the transistor 402 are turned off. The resistor 410 is provided to bleed off the stored charge between the gate and source terminals of the transistor 402 when the transistor 402 is turned off.

The power supply circuit 300 of FIG. 3 and the overvoltage clamp circuit 302*a* of FIG. 4 may be employed in many different applications and products. One example use of these circuits is shown in FIG. 5. However, these circuits could also be used in any other suitable application or product.

FIG. 5 illustrates an example contactless smartcard 500 according to one embodiment of this disclosure. The embodiment of the smartcard 500 shown in FIG. 5 is for illustration only. Other embodiments of the smartcard 500 may be used without departing from the scope of this disclosure.

As shown in FIG. 5, the smartcard 500 includes a carrier 502 having a top insulating layer 504, a bottom insulating layer 506, and embedded electronic circuitry 508. The carrier 502 is capable of carrying or supporting the electronic circuitry 508 of the smartcard 500. For example, the carrier 502 could represent a plastic card or other structure for carrying analog and digital circuits and memory of the smartcard 500. The carrier 502 could have any suitable size or shape, such as a rectangular shape that is thin and small enough to fit inside a wallet like a credit card. As a particular example, the carrier 502 is approximately 3.375 inches long, approximately 2.2125 inches wide, and approximately 0.03 inches thick. Also, the carrier 502 could be formed from any suitable material or materials, such as polyvinylchloride or other plastic.

Figure 1:
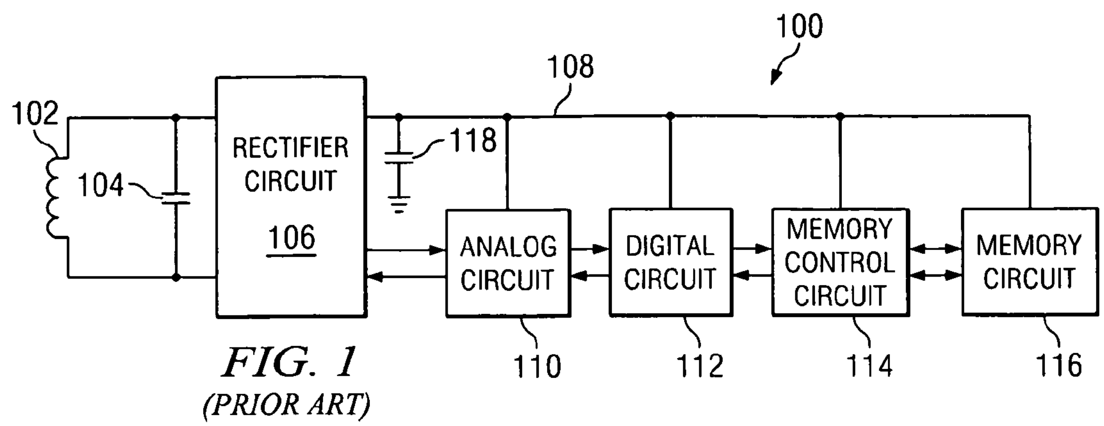
FIG. 1 illustrates a conventional contactless smartcard.
Figure 2:
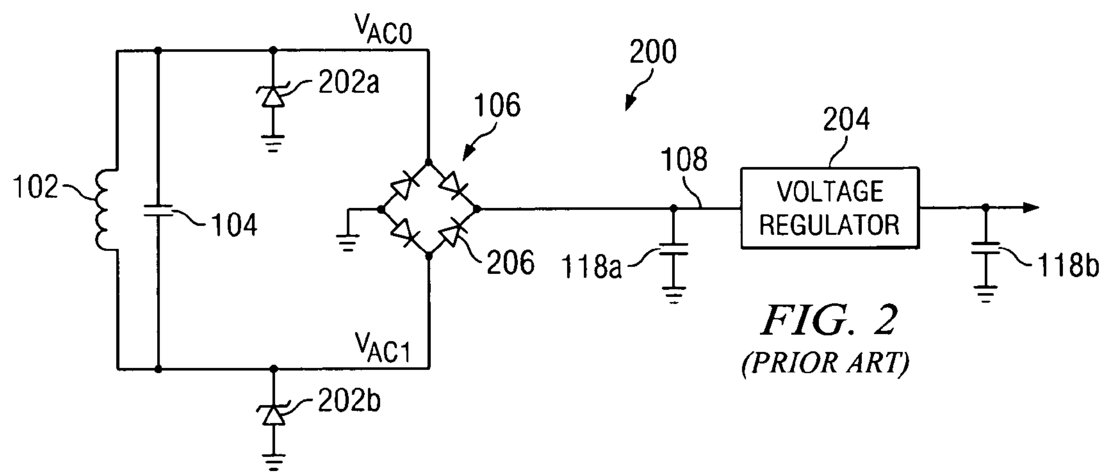
FIG. 2 illustrates a conventional power supply circuit in the conventional contactless smartcard of FIG. 1.

In this example, the electronic circuitry 508 of the smartcard 500 may include the various components shown in FIG. 1. The electronic circuitry 508 may also include the power supply circuit 300 of FIG. 3 and one or multiple overvoltage clamp circuits 302*a* of FIG. 4. In this way, the overvoltage clamp circuit(s) 302*a* may help to protect against overvoltage conditions created on or through the antenna terminal of the smartcard 500.

Although FIGS. 3 through 5 illustrate one example of a power supply circuit 300, an overvoltage clamp circuit 302*a*, and a smartcard 500, various changes may be made to FIGS. 3 through 5. For example, the power supply circuit 300 could include any other or additional components used to generate power. Also, the overvoltage clamp circuit 302*a* could be used in any other suitable power supply circuit, device, or system. Further, some or all of the electronic circuitry 508 in the smartcard 500 may be disposed on one or more surfaces of the smartcard 500 or otherwise be exposed externally. Beyond that, the smartcard 500 may have any suitable shape, such as the shape of an identification badge having an aperture through which a clip or other fastener may be removably attached to the smartcard 500. In addition, the smartcard 500 could include any other or additional electronic circuitry.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The terms "controller" and "control circuit" mean any device, system, or part thereof that controls at least one operation. A controller or control circuit may be implemented in hardware, firmware, or software, or a combination of at least two of the same. It should be noted that the functionality associated with any particular controller or control circuit may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A circuit, comprising:

an antenna configured to generate an alternating current across terminals of the antenna through electromagnetic induction based upon a received signal;

a rectifier coupled to the antenna terminals and configured to receive the alternating current and generate a rectified direct current power supply voltage; and a first voltage clamp coupled to a first of the antenna terminals and a first input to the rectifier and configured to selectively sink at least some current from the first antenna terminal based upon the rectified power supply voltage from the rectifier; and a second voltage clamp coupled to a second of the antenna terminals and a second input to the rectifier and configured to selectively sink at least some current from the second antenna terminal based upon the rectified power supply voltage from the rectifier, the first and second voltage clamps each comprising a first transistor having a first transistor terminal connected to a respective first or second antenna terminal and a second transistor terminal connected to ground, a second, diode-connected transistor, and a resistor, the second transistor and the resistor connected in series between a node configured to receive the rectified power supply voltage and ground, the first and second voltage clamps each configured to turn on the respective first transistor based on a voltage across the respective series-connected second transistor and resistor, wherein an over voltage condition in the rectified power supply voltage causes the first transistor in each of the first and second voltage clamps to sink current from the respective antenna terminal.

2. The circuit of claim 1, wherein the first and second voltage clamps each further comprise:

a sink control circuit configured to activate and deactivate the first transistor based on the voltage across the series-connected second transistor and resistor.

3. The circuit of claim 2, wherein the each first transistor is an N-channel transistor having a drain terminal coupled to the rectified power supply voltage via the resistor, a source terminal coupled to ground, and a gate terminal coupled to the drain terminal.

4. The circuit of claim 3, wherein the first and second voltage clamps are configured to sink at least some current from the first and second antenna terminals when the rectified power supply voltage exceeds a threshold voltage level that is based on at least one of: a resistance of the resistor and a size of the N-channel transistor.

5. The circuit of claim 3, wherein the first and second voltage clamps each further comprise:

a P-channel transistor and a second resistor, the P-channel transistor having a source terminal coupled to the rectified power supply voltage, a drain terminal coupled to ground via the second resistor, and a gate terminal coupled to the drain terminal and the gate terminal of the N-channel transistor.

6. The circuit of claim 5, further comprising:

the voltage regulator coupled to the rectifier, wherein the source terminal of the P-channel transistor is coupled to a node between the rectifier and the voltage regulator.

7. The circuit of claim 5, wherein the second transistor in each of the first and second voltage clamps is an N-channel transistor.

8. The circuit of claim 1, wherein the antenna terminal comprises a portion of a contactless smartcard and is configured to receive electromagnetic waves from at least one of: a contactless smartcard reader and a contactless smartcard writer.

9. The circuit of claim 1, wherein a voltage level of the rectified power supply voltage is proportional to a peak voltage associated with current from the first and second antenna terminals, and sinking current from the first and second antenna terminals reduces the peak voltage.

10. The circuit of claim 1, wherein current from the first and second antenna terminals comprises an alternating current (AC) signal.

11. An apparatus, comprising:

circuitry configured to wirelessly communicate with an external device; and a power supply circuit comprising:

an antenna terminal configured to generate an alternating current across terminals of the antenna through electromagnetic induction based upon a received signal;

a rectifier coupled to the antenna terminals and configured to receive the alternating current and generate a rectified direct current power supply voltage, the circuitry configured to operate using the rectified power supply voltage; and a first voltage clamp coupled to a first of the antenna terminals and a first input to the rectifier and configured to selectively sink at least some current from the first antenna terminal based upon the rectified power supply voltage from the rectifier; and a second voltage clamp coupled to a second of the antenna terminals and a second input to the rectifier and configured to selectively sink at least some current from the second antenna terminal based upon the rectified power supply voltage from the rectifier, the first and second voltage clamps each comprising a first transistor having a first transistor terminal connected to a respective first or second antenna terminal and a second transistor terminal connected to ground, a second, diode-connected transistor, and a resistor, the second transistor and the resistor connected in series between a node configured to receive the rectified power supply voltage and ground, the first and second voltage clamps each configured to turn on the respective first transistor based on a voltage across the respective series-connected second transistor and, resistor, wherein an over voltage condition in the rectified power supply voltage causes the first transistor in each of the first and second voltage clamps to sink current from the respective antenna terminal.

12. The apparatus of claim 11, wherein the first and second voltage clamps each further comprise:

a sink control circuit configured to activate and deactivate the first transistor based on the voltage across the series-connected second transistor and resistor.

13. The apparatus of claim 12, wherein the each first transistor is an N-channel transistor having a drain terminal coupled to the rectified power supply voltage via the resistor, a source terminal coupled to ground, and a gate terminal coupled to the drain terminal.

14. The apparatus of claim 13, wherein the first and second voltage clamps each further comprise:

a P-channel transistor and a second resistor, the P-channel transistor having a source terminal coupled to the rectified power supply voltage, a drain terminal coupled to ground via the second resistor, and a gate terminal coupled to the drain terminal and the gate terminal of the N-channel transistor.

15. The apparatus of claim 14, wherein the second transistor in each of the first and second voltage clamps is an N-channel transistor.

16. The apparatus of claim 11, wherein the apparatus comprises a smartcard, the circuitry comprises an analog circuit, a digital circuit, a memory control circuit, and a memory, and the external device comprises at least one of: a contactless smartcard reader and a contactless smartcard writer.

17. A method, comprising:

generating an alternating current through electromagnetic induction from a signal received at an antenna;

generating a rectified power supply voltage from the alternating current; and using first and second voltage clamps, selectively sinking at least some current from terminals of the antenna based upon the rectified power supply voltage, the first and second voltage clamps each comprising a first transistor having a first transistor terminal connected to a respective first or second antenna terminal and a second transistor terminal connected to ground, a second, diode-connected transistor, and a resistor, the second transistor and the resistor connected in series between a node configured to receive the rectified power supply voltage and ground, the first and second voltage clamps each turning on the respective first transistor based on a voltage across the respective series-connected second transistor and resistor, wherein an over voltage condition in the rectified power supply voltage causes the first transistor in each of the first and second voltage clamps to sink current from the respective antenna terminal.

18. The method of claim 17, further comprising:

using a sink control circuit to activate and deactivate the first transistor in each of the first and second voltage clamps based on the voltage across the series-connected second transistor and resistor.

19. The method of claim 18, further comprising:

using a first N-channel transistor having a drain terminal coupled to the rectified power supply voltage via the resistor, a source terminal coupled to ground, and a gate terminal coupled to the drain terminal of the first N-channel transistor as the first transistor in each of the first and second voltage clamps;

using a P-channel transistor and a second resistor within each of the first and second voltage clamps, the P-channel transistor having a source terminal coupled to the rectified power supply voltage, a drain terminal coupled to ground via the second resistor, and a gate terminal coupled to the drain terminal and the gate terminal of the first N-channel transistor; and using a second N-channel transistor having a drain terminal capable of receiving a voltage associated with the current from the antenna terminal, a source terminal coupled to ground, and a gate terminal coupled to the drain terminal of the P-channel transistor as the second transistor.

20. A voltage clamp circuit, comprising:

first and second antenna terminals configured and connected to generate alternating current based on a signal received at an antenna;

a rectifier configured generate a rectified power supply voltage from the alternating current;

a control circuit comprising first and second voltage clamps and configured to control selective sinking of at least some of the alternating current from the first and second antenna terminals, the control circuit configured to initiate and terminate sinking of the at least some alternating current based upon a voltage level of the rectified power supply voltage from the rectifier, wherein the voltage level of the rectified power supply voltage is proportional to the current from the first and second antenna terminals; and the first and second voltage clamps each comprising a first transistor having a first transistor terminal connected to a respective first or second antenna terminal and a second transistor terminal connected to ground, a second, diode-connected transistor, and a resistor, the second transistor and the resistor connected in series between a node configured to receive the rectified power supply voltage and ground, the first and second voltage clamps each turning on the respective first transistor based on a voltage across the respective series-connected second transistor and resistor, wherein an over voltage condition in the rectified power supply voltage causes the first transistor in each of the first and second voltage clamps to sink current from the respective antenna terminal, and wherein an over voltage condition in the alternating current results in the control circuit clamping the rectified power supply voltage to, at most, a predetermined voltage level.

21. The voltage clamp circuit of claim 20, wherein the control circuit comprises a each of the first transistors is an N-channel transistor, the first N-channel transistor having a drain terminal coupled to the rectified power supply voltage via the resistor for the respective voltage clamp, a source terminal coupled to ground, and a gate terminal coupled to the drain terminal of the N channel transistor.

* * * * *

UNITED STATES PATENT AND TRADEMARK OFFICE

CERTIFICATE OF CORRECTION

PATENT NO. : 8,292,185 B2
APPLICATION NO. : 11/259974
DATED : October 23, 2012
INVENTOR(S) : Kian-Ann Ng It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1029 days.

Signed and Sealed this
Thirtieth Day of September, 2014

Michelle K. Lee
*Deputy Director of the United States Patent and Trademark Office*